United States Patent
Wang et al.

(10) Patent No.: US 10,754,689 B1
(45) Date of Patent: Aug. 25, 2020

(54) ARCHITECTURE AND DEVICE FOR MULTI-STREAM VISION PROCESSING ON SHARED DEVICES

(71) Applicant: GM GLOBAL TECHNOLOGY OPERATIONS LLC, Detroit, MI (US)

(72) Inventors: Shige Wang, Northville, MI (US); Unmesh Dutta Bordoloi, Bloomfield Township, MI (US); Stephen G. Lusko, Warren, MI (US); Stephen N. McKinnie, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 16/274,685

(22) Filed: Feb. 13, 2019

(51) Int. Cl.
*G06F 9/48* (2006.01)
*H04L 12/873* (2013.01)
(Continued)

(52) U.S. Cl.
CPC .......... *G06F 9/4887* (2013.01); *G06F 9/3851* (2013.01); *G06K 9/00791* (2013.01); *H04L 47/52* (2013.01); *H04L 47/6275* (2013.01); *H04L 47/6295* (2013.01); *H04L 67/32* (2013.01)

(58) Field of Classification Search
None
See application file for complete search history.

(56) References Cited

U.S. PATENT DOCUMENTS 7,457,243 B2 * 11/2008 Meggers ............... H04L 47/822
370/230
7,751,317 B2 * 7/2010 Toyama .................. H04L 47/15
370/230

(Continued)

FOREIGN PATENT DOCUMENTS

WO    WO-2014186814 A1 * 11/2014 ............. G08G 1/165

OTHER PUBLICATIONS

'Scheduling I/O Requests with Deadlines: a Performance Evaluation' by Abbott et al., copyright 1990 IEEE. (Year: 1990).*
(Continued)

*Primary Examiner* — Steven G Snyder
(74) *Attorney, Agent, or Firm* — Lorenz & Kopf, LLP

(57) ABSTRACT

A stream manager for managing the distribution of instructions to a plurality of processing devices includes a dispatcher module configured to: receive multiple instruction streams, wherein each instruction stream includes a plurality of requested computations for processing perception data from a perception data source; partition each instruction stream into a plurality of partitions based on type of device to perform a requested computation from the instruction stream; assign a release time and deadline to each partition, and dispatch partition computations to a plurality of scheduling queues to distribute processing of the partition computations amongst the plurality of processing devices. The plurality of scheduling queues include: a plurality of CPU schedulers, wherein each CPU scheduler is assigned to a specific CPU and a specific scheduling queue; and a plural- (Continued)

ity of accelerator schedulers, wherein each accelerator scheduler is assigned to a specific scheduling queue and a specific type of accelerator.

20 Claims, 8 Drawing Sheets

(51) Int. Cl.
*G06F 9/38* (2018.01)
*H04L 29/08* (2006.01)
*H04L 12/865* (2013.01)
*H04L 12/863* (2013.01)
*G06K 9/00* (2006.01)

(56) References Cited

U.S. PATENT DOCUMENTS

| | | | | |
|---|---|---|---|---|
| 8,141,088 | B2* | 3/2012 | Morishita | G06F 9/3802 712/215 |
| 8,606,951 | B2* | 12/2013 | Green | H04N 21/238 709/231 |
| 8,776,066 | B2* | 7/2014 | Krishnamurthy | G06F 9/5038 718/102 |
| 9,229,792 | B1* | 1/2016 | Gandhe | H04L 67/322 |
| 9,363,302 | B2* | 6/2016 | Green | H04N 21/238 |
| 9,389,853 | B2* | 7/2016 | Wu | G06F 1/3206 |
| 10,572,748 | B2* | 2/2020 | Wang | G06K 9/00986 |
| 2008/0109809 | A1* | 5/2008 | Morishita | G06F 9/3802 718/103 |
| 2011/0131580 | A1* | 6/2011 | Krishnamurthy | G06F 9/5094 718/102 |
| 2014/0101420 | A1* | 4/2014 | Wu | G06F 1/324 713/1 |
| 2016/0104265 | A1* | 4/2016 | Poledna | G08G 1/166 382/307 |
| 2016/0269240 | A1* | 9/2016 | Balakrishnan | H04L 67/322 |
| 2019/0171895 | A1* | 6/2019 | Wang | G05D 1/0246 |

OTHER PUBLICATIONS

'Mixed-Criticality Multicore Scheduling of Real-Time Gang Task Systems' by Ashikahnned Bhuiyan et al., 2019 IEEE Real-Time Systems Symposium (RTSS). (Year: 2019).*

'The Integration of Deadline and Criticalness in Hard Real-Time Scheduling' by Sara R. Biyabani et al., copyright 1988 IEEE. (Year: 1988).*

'Deadline-based Scheduling for GPU with Preemption Support' by Nicola Capodieci, 2018 IEEE Real-Time Systems Symposium. (Year: 2018).*

'A Multi-Buffer Scheduling Scheme for Video Streaming' by Hongli Luo et al., copyright 2005 IEEE. (Year: 2005).*

'Re-thinking CNN Frameworks for Time-Sensitive Autonomous-Driving Applications: Addressing an Industrial Challenge' by Ming Yang et al., 2019 IEEE Real-Time and Embedded Technology and Applications Symposium (RTAS). (Year: 2019).*

* cited by examiner

US 10,754,689 B1

ARCHITECTURE AND DEVICE FOR MULTI-STREAM VISION PROCESSING ON SHARED DEVICES

TECHNICAL FIELD

The technology described in this patent document relates generally to computer systems and more particularly to computers system architectures that allow processing resources to be shared.

Advanced autonomous vehicle (AV) and advanced driver-assistance system (ADAS) applications utilize multiple perception devices, such as cameras, and consequently process data from the multiple perception devices. The processing of a perception stream from a perception device may involve computations by both a CPU (central processing unit) and an accelerator (e.g., GPUs, DSPs, FPGAs). When multiple perception streams require computations, the processing of the multiple perception streams may involve computations by multiple CPUs and accelerators that are often shared by the multiple perception streams. The computation on these devices, the CPUs and accelerators, may not be well synchronized for the multiple perception streams, resulting in lost processing capacity and higher costs.

Accordingly, it is desirable to provide a system and method for improving the synchronization of computations on the multiple CPUs and accelerators. Furthermore, other desirable features and characteristics of the present invention will become apparent from the subsequent detailed description of the invention and the appended claims, taken in conjunction with the accompanying drawings and the background of the invention.

SUMMARY

Systems and methods for sharing computing resources are provided. In one embodiment, an instruction stream manager for managing the distribution of instructions to a plurality of processing devices is provided, wherein the plurality of processing devices includes a plurality of central processing units (CPUs) and a plurality of accelerator devices. The instruction stream manager includes a dispatcher module configured to: receive multiple instruction streams, wherein each instruction stream includes a plurality of requested computations for processing perception data from a perception data source; partition each instruction stream into a plurality of partitions based on a device or type of device to perform a requested computation from the instruction stream; assign a release time and deadline to each partition, wherein the release time is the earliest point in time at which the partition can start to execute and the deadline is the latest point in time at which the partition must be completed to ensure performance, and wherein the partitions of the same stream are to be scheduled for computation on different devices assigned a partition from the same stream, based on time, to reduce synchronization overhead for synchronizing computation performance by the different devices; and dispatch partition computations to a plurality of scheduling queues to distribute processing of the partition computations amongst the plurality of processing devices, wherein a partition computation includes a partition with its assigned release time and deadline. The plurality of scheduling queues are arranged in memory, wherein each scheduling queue is associated with a unique processing device. The plurality of scheduling queues include: a plurality of CPU schedulers, wherein each CPU scheduler is assigned to a specific CPU and a specific scheduling queue; and a plurality of accelerator schedulers, wherein each accelerator scheduler is assigned to a specific scheduling queue and a specific accelerator or type of accelerator that shares the same scheduling policy.

In one embodiment, the plurality of accelerator devices include one or more of a graphics processing unit (GPU), digital signal processor (DSP), and field-programmable gate array (FPGA).

In one embodiment, the multiple perception data sources include one or more of a camera, radar, and lidar.

In one embodiment, to assign a release time and deadline, the dispatcher module is configured to compute the release time and deadline.

In one embodiment, to compute the release time and deadline, the dispatcher module is configured to determine the release time and deadline for processing a frame of perception data using proportional time slicing.

In one embodiment, to compute the release time and deadline, the dispatcher module is configured to determine the release time and deadline for processing a frame of perception data by setting the release time of the first partition as the start time of a frame, setting the release time of a subsequent partition as the deadline of the immediately prior partition, and setting the deadline of a partition equal to the release time of the partition plus a proportional time slice of the frame.

In one embodiment, to compute the release time and deadline, the dispatcher module is configured to determine the release time and deadline for processing a frame of perception data by $r_1=t_0$, $r_i=d_{i-1}$, and $$d_i = r_i + \frac{D - \sum e_i}{\sum e_i} * e_i,$$

wherein $r_1$ is the initial release time, $t_0$ is start time of a frame in the stream, $r_i$ is the release time of partition i on its device, partition i on its device, $d_i$ is the deadline of partition i on its device, D is maximum allowed time to finish processing of a frame, and $e_i$ is processing time of partition i on its device.

In one embodiment, to dispatch partition computations, the dispatcher module is configured to assign computations for streams to processing devices according to predefined strategies and regulate the processing of each stream when one stream overuses its assigned processing unit.

In one embodiment, to dispatch partition computations, the dispatcher module is configured to scan the streams according to their rates, provide a static assignment of CPUs for streams, and provide a static assignment of accelerators for streams.

In one embodiment, the dispatcher module is further configured to notify a higher level entity that incorporates the dispatcher module for action, and/or execute a predefined admission control policy when a stream exceeds its resource budget.

In one embodiment, to dispatch partition computations, the dispatcher module is configured to: read input from a stream identifier; process a current code segment of the stream identifier; select a device identifier with minimum usage to run the code segment of the stream identifier; determine if the code segment of the stream identifier can be completed on the device identifier selected to run the code segment of the stream identifier based on release time, deadline, and device usage; send the code segment of the stream identifier to the device identifier selected to run the code segment of the stream identifier when it is determined that the code segment of the stream identifier can be completed on the device identifier selected to run the code segment of the stream identifier; exclude the device identifier selected to run the code segment of the stream identifier and select a different device identifier with minimum usage to run the code segment of the stream identifier, when it is determined that the code segment of the stream identifier cannot be completed on the device identifier selected to run the code segment of the stream identifier and another device identifier selected to run the code segment of the stream identifier exists that can be considered for use; send a notification to a higher level entity and/or execute a strategy and move to next stream identifier when it is determined that the code segment of the stream identifier cannot be completed on the device identifier selected to run the code segment of the stream identifier and another device identifier cannot be selected to run the code segment of the stream identifier; after sending the code segment of the stream identifier to the device identifier to run the code segment of the stream identifier, move to the next code segment of the stream identifier when another code segment of the stream identifier exists; and after sending the code segment of the stream identifier to the device identifier to run the code segment of the stream identifier, move to the next stream identifier when another code segment of the stream identifier does not exist.

In one embodiment, each scheduling queue is static, organized with a predefined, specific read policy, and orders computation according to priority.

In one embodiment, a set of predefined tasks is assigned to each CPU; a task may execute computations from one or more streams; for each stream, CPU computations are always assigned to a specific CPU and the tasks of the specific CPU; each CPU scheduler is configured to schedule tasks to its associated CPU based on task priority, release time, and deadline; and each CPU scheduler is configured to monitor usage of its associated CPU and report the usage to the dispatcher module.

In one embodiment, each accelerator scheduler is configured to schedule accelerator computations to its associated accelerator based on priority, release time, and deadline; each accelerator scheduler is configured to schedule accelerator computations from different streams to its associated accelerator for execution in ascending order of their dispatch when start of execution is not dependent on completion of precedent CPU task; each accelerator scheduler is configured to communicate with a CPU scheduler that is assigned tasks with computations from a stream serviced by the accelerator scheduler, but is not configured to communicate with other accelerator schedulers; and each accelerator scheduler is configured to monitor usage of its associated accelerator, use bandwidth server to regulate requests from different streams, and report the usage to the dispatcher module.

In another embodiment, a method in a multiprocessor system for managing the distribution of instructions from a plurality of instruction streams to a plurality of processing devices is provided. The plurality of processing devices include a plurality of central processing units (CPUs) and a plurality of accelerator devices. The method includes: receiving the plurality of instruction streams, wherein each instruction stream including a plurality of requested computations; partitioning each instruction stream into a plurality of partitions based on a device or type of device to perform a requested computation from the instruction stream; assigning a release time and deadline to each partition, wherein the release time is the earliest point in time at which the partition can start to execute and the deadline is the latest point in time at which the partition must be completed to ensure performance, wherein the partitions of the same stream are to be scheduled for computation on different devices assigned a partition from the same stream, based on release time and deadline, to reduce synchronization overhead for synchronizing computation performance by the different devices; and dispatching partition computations to a plurality of scheduling queues to distribute processing of the partition computations amongst the plurality of processing devices, wherein a partition computation includes a partition with its assigned release time and deadline, the plurality of scheduling queues are arranged in memory, and each scheduling queue is associated with a unique processing device.

In one embodiment, assigning a release time and deadline includes computing the release time and deadline.

In one embodiment, computing the release time and deadline includes determining the release time and deadline for processing a frame of perception data using proportional time slicing.

In one embodiment, computing the release time and deadline includes determining the release time and deadline for processing a frame of perception data by setting the release time of the first partition as the start time of a frame, setting the release time of a subsequent partition as the deadline of the immediately prior partition, and setting the deadline of a partition equal to the release time of the partition plus a proportional time slice of the frame.

In one embodiment, computing the release time and deadline includes determining the release time and deadline for processing a frame of perception data by $r_1 = t_0$, $r_i = d_{i-1}$, and $$d_i = r_i + \frac{D - \sum e_i}{\sum e_i} * e_i,$$

wherein $r_1$ is the initial release time, $t_0$ is start time of a frame in the stream, $r_i$ is the release time of partition i on its device, partition i on its device, $d_i$ is the deadline of partition i on its device, D is maximum allowed time to finish processing of a frame, and $e_i$ is processing time of partition i on its device.

In one embodiment, dispatching partition computations includes assigning computations for streams to processing devices according to predefined strategies and regulating the processing of each stream when one stream overuses its assigned processing unit.

In one embodiment, dispatching partition computations includes scanning the streams according to their rates, providing a static assignment of CPUs for streams, and providing a static assignment of accelerators for streams.

In one embodiment, the plurality of scheduling queues includes: a plurality of CPU schedulers, wherein each CPU scheduler is assigned to a specific CPU and a specific scheduling queue; and a plurality of accelerator schedulers, wherein each accelerator scheduler is assigned to a specific scheduling queue and a specific accelerator or type of accelerator that shares the same scheduling policy.

In one embodiment, a set of predefined tasks is assigned to each CPU; a task may execute computations from one or more streams; for each stream, CPU computations are always assigned to a specific CPU and the tasks of the specific CPU; each CPU scheduler is configured to schedule tasks to its associated CPU based on task priority, release time, and deadline; and each CPU scheduler is configured to monitor usage of its associated CPU and report the usage to the dispatcher module.

In one embodiment, each accelerator scheduler is configured to schedule accelerator computations to its associated accelerator based on priority, release time, and deadline; each accelerator scheduler is configured to schedule accelerator computations from different streams to its associated accelerator for execution in ascending order of their dispatch when start of execution is not dependent on completion of precedent CPU task; each accelerator scheduler is configured to communicate with a CPU scheduler that is assigned tasks with computations from a stream serviced by the accelerator scheduler, but is not configured to communicate with other accelerator schedulers; and each accelerator scheduler is configured to monitor usage of its associated accelerator, use bandwidth server to regulate requests from different streams, and report the usage to the dispatcher module.

In one embodiment, dispatching partition computations includes: reading input from a stream identifier; processing a current code segment of the stream identifier; selecting a device identifier with minimum usage to run the code segment of the stream identifier; determining if the code segment of the stream identifier can be completed on the device identifier selected to run the code segment of the stream identifier based on release time, deadline, and device usage; sending the code segment of the stream identifier to the device identifier selected to run the code segment of the stream identifier when it is determined that the code segment of the stream identifier can be completed on the device identifier selected to run the code segment of the stream identifier; excluding the device identifier selected to run the code segment of the stream identifier and selecting a different device identifier with minimum usage to run the code segment of the stream identifier, when it is determined that the code segment of the stream identifier cannot be completed on the device identifier selected to run the code segment of the stream identifier and another device identifier selected to run the code segment of the stream identifier exists that can be considered for use; sending a notification to a higher level entity and/or executing a strategy and moving to next stream identifier when it is determined that the code segment of the stream identifier cannot be completed on the device identifier selected to run the code segment of the stream identifier and another device identifier cannot be selected to run the code segment of the stream identifier; after sending the code segment of the stream identifier to the device identifier to run the code segment of the stream identifier, moving to the next code segment of the stream identifier when another code segment of the stream identifier exists; and after sending the code segment of the stream identifier to the device identifier to run the code segment of the stream identifier, moving to the next stream identifier when another code segment of the stream identifier does not exist.

In another embodiment, a perception processing system configured for processing perception data from multiple perception data sources is provided. The system includes: a plurality of processing units including a plurality of central processing units (CPUs) and a plurality of accelerator modules; a vision processing controller (VPC) configured to perform computations from multiple instruction streams using the plurality of processing units; and a dispatcher module. The dispatcher module is configured to: receive the multiple instruction streams, each instruction stream including a plurality of requested computations for processing perception data from a perception data source; partition each instruction stream into a plurality of partitions based on a device or type of device to perform a requested computation from the instruction stream; assign a release time and deadline to each partition, the release time being the earliest point in time at which the partition can start to execute, the deadline being the latest point in time at which the partition must be completed to ensure performance, wherein the partitions of the same stream are to be scheduled for computation on different devices assigned a partition from the same stream, based on time, to reduce synchronization overhead for synchronizing computation performance by the different devices; and dispatch partition computations to a plurality of scheduling queues to distribute processing of the partition computations amongst the plurality of processing devices, a partition computation including a partition with its assigned release time and deadline, the plurality of scheduling queues arranged in memory, wherein each scheduling queue is associated with a unique processing device.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
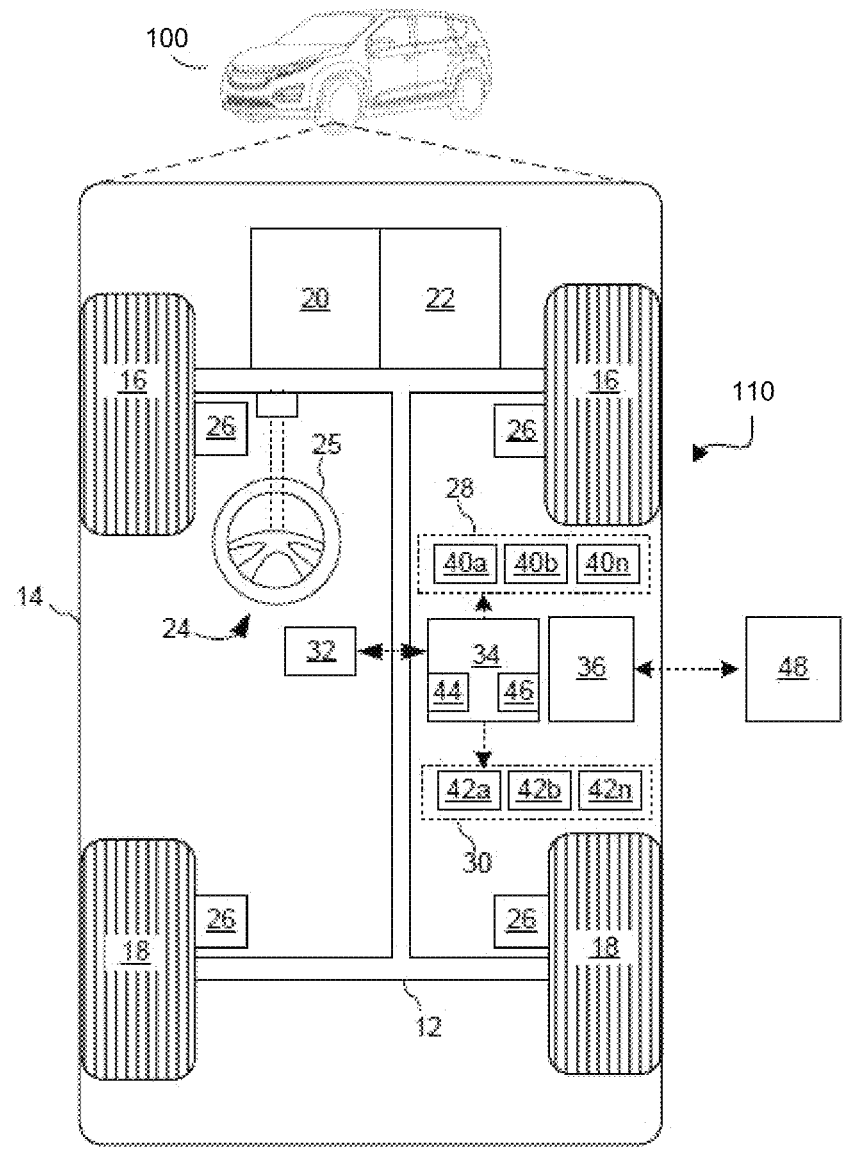
FIG. 1 depicts an example vehicle that includes a stream manager for managing the distribution of instructions from perception streams to a plurality of processing devices, in accordance with various embodiments.

The following detailed description is merely exemplary in nature and is not intended to limit the application and uses.

Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles that describe an architecture supporting multiple streams of perception (e.g., vision) processing of perception data from multiple perception devices (e.g., cameras, lidar, radar) on a shared processing device using a hybrid scheduling method. The following disclosure provides an architecture design supporting multiple schedules for different devices, a mechanism to dynamically assign devices for a stream combined with stream affinity, multiple cooperative schedulers for CPU and accelerators, fine-grain partitioning of computations on accelerators, and a bandwidth server to control computation on each accelerator.

FIG. 1 depicts an example vehicle 100 that includes a stream manager 110 for managing the distribution of instructions from perception streams to a plurality of processing devices. As depicted in FIG. 1, the vehicle 100 generally includes a chassis 12, a body 14, front wheels 16, and rear wheels 18. The body 14 is arranged on the chassis 12 and substantially encloses components of the vehicle 100. The body 14 and the chassis 12 may jointly form a frame. The wheels 16-18 are each rotationally coupled to the chassis 12 near a respective corner of the body 14.

In various embodiments, the vehicle 100 may be an autonomous vehicle or a semi-autonomous vehicle. An autonomous vehicle 100 is, for example, a vehicle that is automatically controlled to carry passengers from one location to another. The vehicle 100 is depicted in the illustrated embodiment as a passenger car, but other vehicle types, including motorcycles, trucks, sport utility vehicles (SUVs), recreational vehicles (RVs), marine vessels, aircraft, etc., may also be used.

As shown, the vehicle 100 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 100 (such as the state of one or more occupants) and generate sensor data relating thereto. Sensing devices 40a-40n might include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, vehicle 100 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the vehicle 100. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or nonvolatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 100. In various embodiments, controller 34 is configured to implement a stream manager 110 as discussed in detail below.

The instructions may include one or more separate programs, each of which comprises an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 100, and generate control signals that are transmitted to the actuator system 30 to automatically control the components of the vehicle 100 based on the logic, calculations, methods, and/or algorithms. Although only one controller 34 is shown in FIG. 1, embodiments of the vehicle 100 may include any number of controllers 34 that communicate over any suitable communication medium or a combination of communication mediums and that cooperate to process the sensor signals, perform logic, calculations, methods, and/or algorithms, and generate control signals to automatically control features of the vehicle 100.

The communication system 36 is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
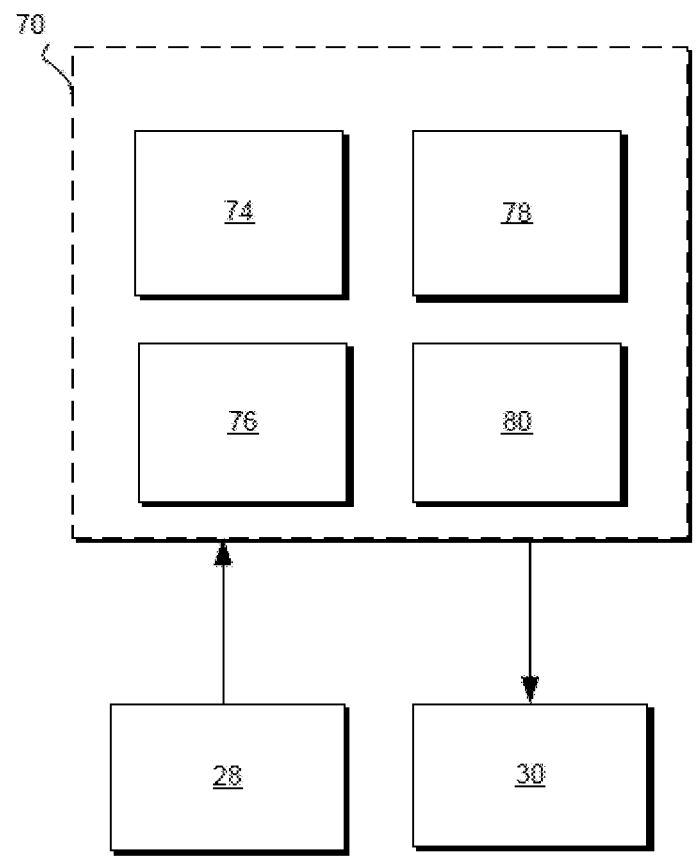
FIG. 2 is a functional block diagram illustrating an autonomous driving system (ADS) associated with an autonomous vehicle, in accordance with various embodiments.

In accordance with various embodiments, controller 34 may implement an autonomous driving system (ADS) 70 as shown in FIG. 2. That is, suitable software and/or hardware components of controller 34 (e.g., processor 44 and computer-readable storage device 46) may be utilized to provide an autonomous driving system 70 that is used in conjunction with vehicle 100.

In various embodiments, the instructions of the autonomous driving system 70 may be organized by function or system. For example, as shown in FIG. 2, the autonomous driving system 70 can include a perception system 74, a positioning system 76, a path planning system 78, and a vehicle control system 80. As can be appreciated, in various embodiments, the instructions may be organized into any number of systems (e.g., combined, further partitioned, etc.) as the disclosure is not limited to the present examples.

In various embodiments, the perception system 74 synthesizes and processes the acquired sensor data and predicts the presence, location, classification, and/or path of objects and features of the environment of the vehicle 100. In various embodiments, the perception system 74 can incorporate information from multiple sensors (e.g., sensor system 28), including but not limited to cameras, lidars, radars, and/or any number of other types of sensors.

The positioning system 76 processes sensor data along with other data to determine a position (e.g., a local position relative to a map, an exact position relative to a lane of a road, a vehicle heading, etc.) of the vehicle 100 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data along with other data to determine a path for the vehicle 100 to follow. The vehicle control system 80 generates control signals for controlling the vehicle 100 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 3A:
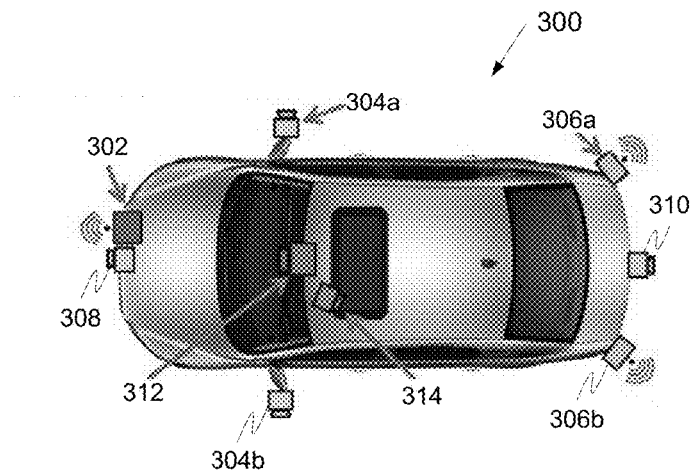
FIG. 3A depicts an example vehicle having a plurality of perception devices for performing detection and viewing operations for the vehicle, in accordance with various embodiments.

FIG. 3A depicts an example vehicle 300 having a plurality of perception devices for performing detection and viewing operations for the vehicle. The detection operations may provide object detection, pedestrian detection, sign detection, traffic detection, lane detection, free space detection, occupant/seat belt/child seat detection, and others. The viewing operations may provide a surround view, rear view, blind spot view, in-cabin view, and others. The perception devices, in this example, include a front radar 302 for adaptive cruise control and distance warning, surround view cameras 304a/304b for displaying in an infotainment system a view on either side of the vehicle, blind spot detection radars 306a/306b, a front view camera 308, a rear view camera 310, a front camera 312 with visual or haptic warning, and a driver monitoring camera 314 with haptic or acoustic warning. The multiple perception devices generate multiple streams of perception data. The multiple streams of perception data may be processed by a common set of resources.

Figure 3B:
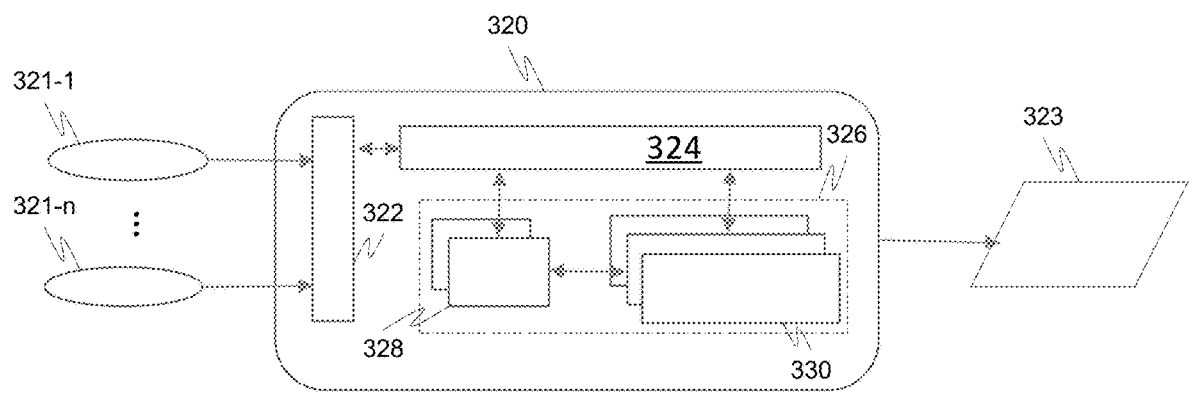
FIG. 3B is a block diagram of an example processing module in the vehicle for processing multiple streams of perception data, in accordance with various embodiments.

FIG. 3B is a block diagram of an example processing module 320 in the vehicle 300 for processing multiple streams 321-1 to 321-n of perception data. The example processing module 320 includes an I/O controller 322 for receiving the streams 321-1 to 321-n and storing the streams in memory 324. The example processing module 320 further includes a plurality of processing devices 326 for processing the data in the memory 324 and generating processed data 323. The plurality of processing devices 326 includes a plurality of CPUs 328 and a plurality of accelerators 330, each of which is under the control of a CPU 328. Examples of an accelerator 330 include a graphics processing unit (GPU), digital signal processor (DSP), field programmable gate array (FPGA), a math co-processor, and others. The CPUs 328 are configured to perform tasks and the accelerators 330 are configured to perform computations.

To generate the processed data 323, multiple instruction streams—one for each stream of perception data from a perception device—contend for the same set of resources (both hardware and software library functions). A different algorithm may be used to process each instruction stream and may require different devices that are suitable for different types of computations. Each algorithm may require cooperative CPUs and accelerators. Scheduling a CPU to perform a task may require a different methodology than scheduling an accelerator to perform a computation—computations on a CPU can be preempted, but computations on accelerators may not; and CPU execution may only be concurrent (e.g., time multiplex), whereas accelerator execution may be true parallel execution.

Figure 4:
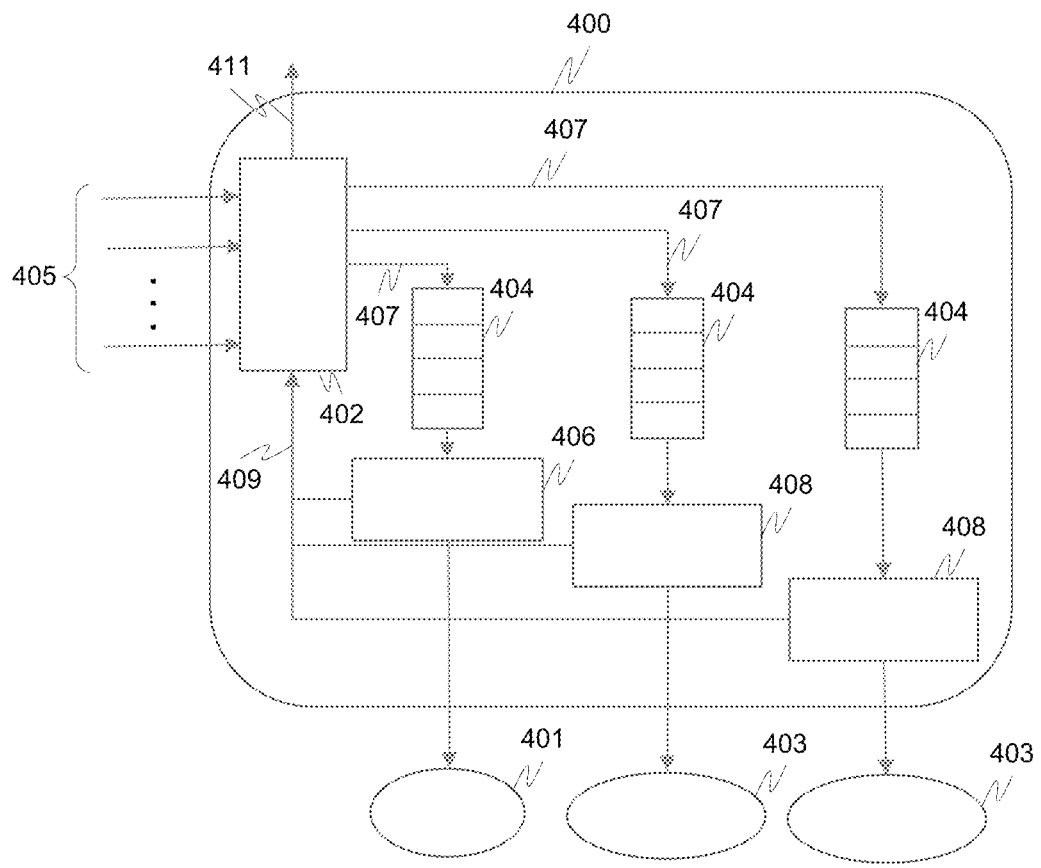
FIG. 4 is a block diagram depicting an example instruction stream manager in a vision processing controller (VPC), in accordance with various embodiments.

FIG. 4 is a block diagram depicting an example instruction stream manager 400 in a vision processing controller (VPC). The example instruction stream manager 400 may be implemented via hardware or as a software service. The example instruction stream manager 400 is configured to manage the distribution of instructions (e.g., for processing perception data from multiple perception data sources) to a plurality of processing devices, wherein the plurality of processing devices include a plurality of CPUs 401 and a plurality of accelerator devices 403. The multiple perception data sources may include one or more of a camera, radar, and lidar. The plurality of accelerator devices may include one or more of a graphics processing unit (GPU), digital signal processor (DSP), and field-programmable gate array (FPGA). The example instruction stream manager 400 includes a dispatcher 402, a plurality of scheduling queues 404, a plurality of CPU schedulers 406, and a plurality of accelerator schedulers 408.

The example dispatcher 402 is configured to receive multiple instruction streams, each instruction stream including a plurality of requested computations for processing data (e.g., perception data such as vision data) from a data source (e.g., a perception data source such as a camera, lidar, radar). The example dispatcher 402 is further configured to partition each instruction stream into a plurality of partitions based on a device or type of device to perform a requested computation from the partition.

The example dispatcher 402 is configured to assign a release time and deadline to each partition, wherein the release time is the earliest point in time at which the partition can start to execute and the deadline is the latest point in time at which the partition must be completed to ensure performance. The partitions of the same stream that are scheduled for computation on different devised are to be scheduled based on time (release time and deadline) to reduce synchronization overhead for synchronizing computation performance by the different devices.

Before assigning a release time and deadline, the example dispatcher 402 is configured to compute the release time and deadline. To compute the release time and deadline, the example dispatcher 402 is configured to determine the release time and deadline for processing a frame of perception data using proportional time slicing. The example dispatcher 402 is configured to determine the release time and deadline for processing a frame of perception data by setting the release time of the first partition as the start time of a frame, setting the release time of a subsequent partition as the deadline of the immediately prior partition, and setting the deadline of a partition equal to the release time of the partition plus a proportional time slice of the frame.

Figure 5A:
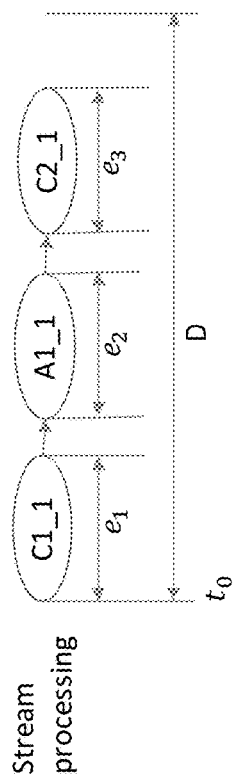
FIG. 5A is a diagram illustrating parameters that can be used to compute the release time and deadline, in accordance with various embodiments.

FIG. 5A is a diagram illustrating parameters that can be used to compute the release time and deadline. To compute the release time and deadline, the example dispatcher 402 is configured to determine the release time and deadline for processing a frame of perception data using the following mathematical formulation: $r_1 = t_0$, $r_i = d_{i-1}$, and $$d_i = r_i + \frac{D - \sum e_i}{\sum e_i} * e_i,$$

wherein $r_1$ is the initial release time, $t_0$ is start time of a frame in the stream, $r_i$ is the release time of partition i on its device, $d_i$ is the deadline of partition i on its device, D is maximum allowed time to finish processing of a frame, and $e_i$ is processing time of partition i on its device.

Referring back to FIG. 4, the example dispatcher 402 is configured to dispatch partition computations 407 to a plurality of scheduling queues 404 to distribute processing of the partition computations 407 amongst the plurality of processing devices 401, 403. In this example, a partition computation includes a partition with its assigned release time and deadline.

The example dispatcher 402 is further configured to notify via notification 409 a higher level entity that incorporates the example dispatcher 402 (e.g., VPC) for action (e.g., disable feature), and/or execute a predefined admission control policy (e.g., skip a frame, or reassign computations of one or more partitions) when a stream exceeds its resource budget. The example dispatcher 402 receives resource usage information 411 from device schedulers 406, 408 to determine the usage of various CPUs 401 and accelerators 403.

Figure 5B:
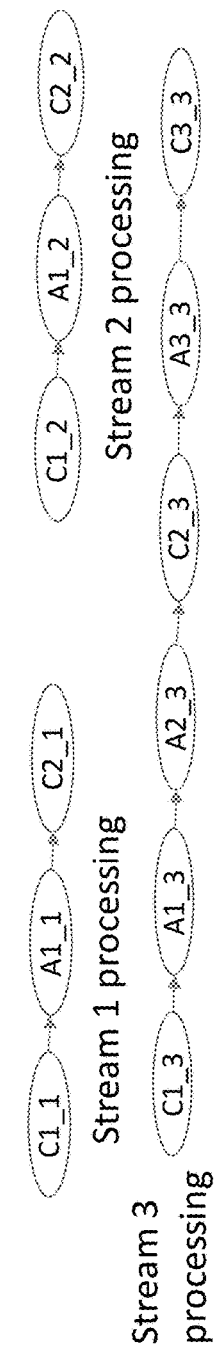
FIG. 5B is a diagram illustrating example stream processing, in accordance with various embodiments.
Figure 5C:
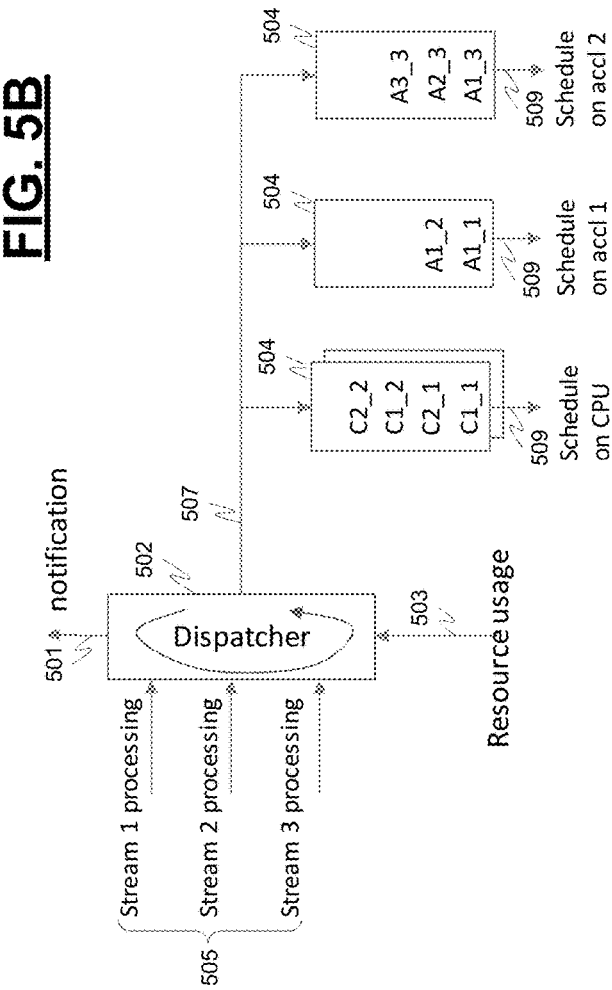
FIG. 5C is a block diagram illustrating the dispatching of computations from various streams to various scheduling queues, in accordance with various embodiments.

FIG. 5B is a diagram illustrating example stream processing and FIG. 5C is a block diagram illustrating the dispatching of computations 407 from various streams 405 to various scheduling queues 404. To dispatch partition computations 407, the example dispatcher 402 is configured to assign computations 407 for streams to processing devices according to predefined strategies and regulate the processing of each stream when one stream overuses its assigned processing unit. The example dispatcher 402 is configured to scan the streams according to their rates, provide a static assignment of CPUs 401 for streams, and provide a static assignment of accelerators 403 for streams. The example dispatcher 402 is further configured to notify via notification 501 a higher level entity that incorporates the example dispatcher 402 for action (e.g., disable feature), and/or execute a predefined admission control policy (e.g., skip a frame, or reassign computations of one or more partitions) when a stream exceeds its resource budget. The example dispatcher 402 receives resource usage information 503 from device schedulers (not shown) to determine the usage of various CPUs 401 and accelerators 403. Computations 407 provided to the queues 404 are subsequently provided to schedulers (not shown) to schedule actions 409 by their associated devices.

The example dispatcher 402 uses information collected offline and stored in a table (e.g. as calibration) for assigning calculations 407 to queues 404. Depicted in the table below is example information that may be collected.

| strm_id | seg_comp | dev_id | time_c | s_time | e_time | mem | comm |
|---|---|---|---|---|---|---|---|
| 1 | c1 | cpu0, 1 | 1 | 0 | 5 | 1 | 8 |
|  | a1 | gpu1 | 0.4 | 5 | 10 | 10 | 10 |
|  | a1 | cpu1 | 3 | 5 | 12 | 2 | 3 |
|  | c2 | cpu0, 1 | 2 | 12 | 20 | 6 | 3 |
| 2 | c1 | cpu0 | 2 | 0 | 4 | 2 | 10 |
|  | a1 | gpu2 | 1 | 4 | 7 | 3 | 10 |
|  | a2 | gpu2 | 2 | 7 | 10 | 3 | 3 |

Figure 6:
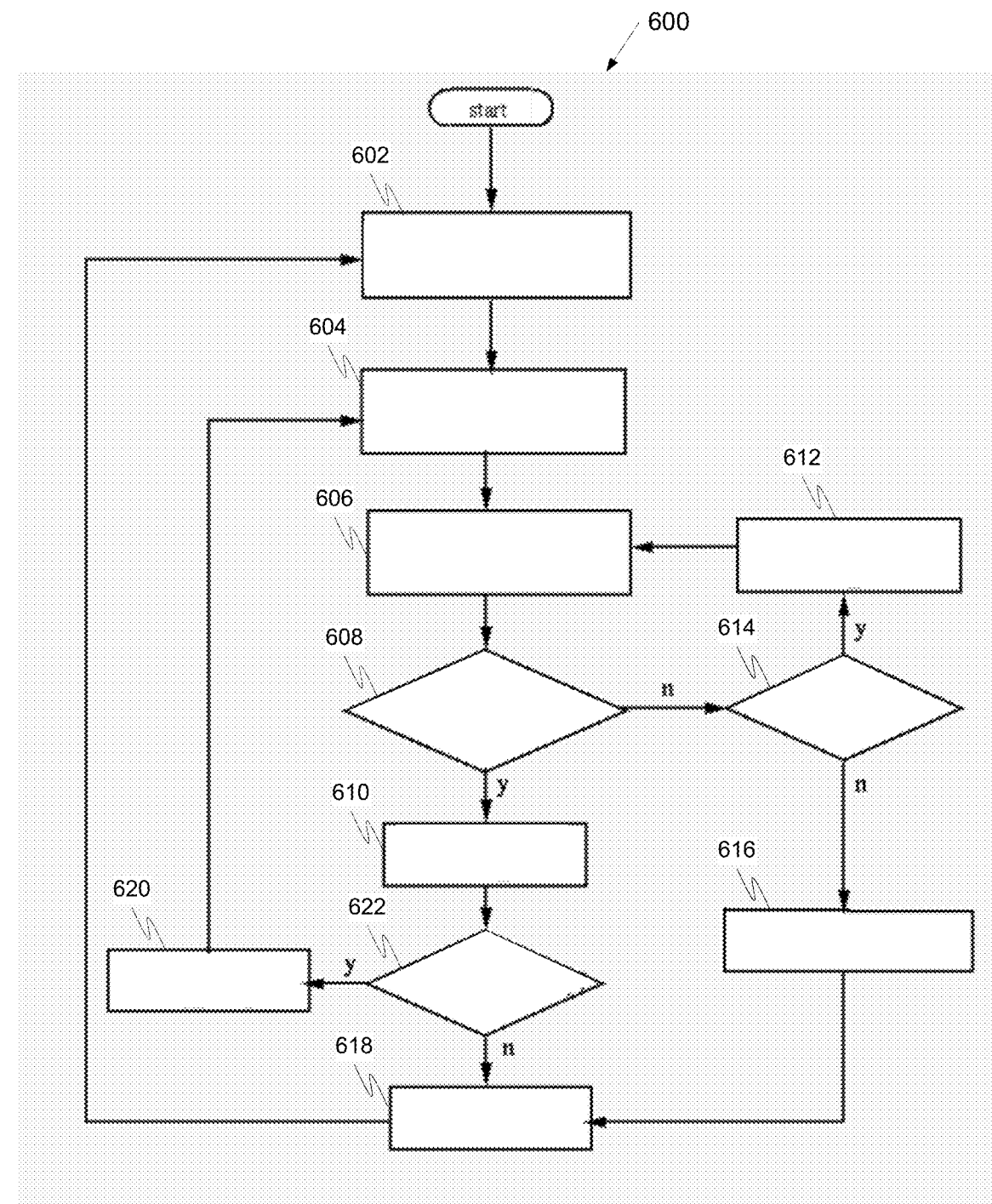
FIG. 6 is a process flow chart depicting an example process performed by an example dispatcher, in accordance with various embodiments.

| strm_id | seg_comp | dev_id | time_c | s_time | e_time | mem | comm |
|---|---|---|---|---|---|---|---|
| | a2 | cpu0 | 4 | 7 | 13 | 1 | 6 |
| ... | ... | ... | ... | ... | ... | ... | ... | strm_id: stream identifier
seg_comp: code segment of strm_id
dev_id: device identifier to run seg_comp
time_c: computation time of seg_comp on dev_id
s_time: seg_comp earliest start time
e_time: seg_comp latest completion time
mem: memory resource usage for seg_comp
comm: communication resource usage for seg_comp FIG. 6 is a process flow chart depicting an example process 600 performed by an example dispatcher 402. The example process 600 includes reading input from a stream identifier (operation 602); processing a current code segment of the stream identifier (operation 604); selecting a device identifier with minimum usage to run the code segment of the stream identifier (operation 606); and determining if the code segment of the stream identifier can be completed on the device identifier selected to run the code segment of the stream identifier based on release time, deadline, and device usage (decision 608).

The example process 600 includes sending a code segment of the stream identifier to the device identifier selected to run the code segment of the stream identifier (operation 610), when it is determined that the code segment of the stream identifier can be completed on the device identifier selected to run the code segment of the stream identifier (yes at decision 608). The example process 600 includes excluding the device identifier selected to run the code segment of the stream identifier (operation 612) and selecting a different device identifier to run the code segment of the stream identifier that has minimum usage (operation 606), when it is determined that code segment of stream identifier cannot be completed on the device identifier selected to run the code segment of the stream identifier (no at decision 608) and another device identifier can be selected to run the code segment of the stream identifier (yes at decision 614).

The example process 600 includes sending a notification to the higher level entity (e.g., VPC) and/or executing a predefined admission control policy (e.g., skip a frame, or reassign computations of one or more partitions) (operation 616) and moving to the next stream identifier (operation 618), when it is determined that the code segment of the stream identifier cannot be completed on a device identifier selected to run the code segment of the stream identifier (no at decision 608) and no other device identifier can be selected to run the code segment of the stream identifier (no at decision 614).

After sending the code segment of the stream identifier to the selected device identifier to run the code segment of the stream identifier (operation 610), the example process 600 includes moving to the next code segment of the stream identifier (operation 620), when another code segment of the stream identifier exists (yes at decision 622). After sending the code segment of the stream identifier to the device identifier selected to run the code segment of the stream identifier (operation 610), the example process includes moving to the next stream identifier (operation 618), when another code segment of the stream identifier does not exist (no at decision 622). After moving to the next stream identifier (operation 618), the example process 600 includes reading input from the stream identifier (operation 602). After moving to next code segment of the stream identifier (operation 620), the example process 600 includes processing the current code segment of the stream identifier (operation 604).

Referring back to FIG. 4, the example scheduling queues 404 are arranged in memory, wherein each example scheduling queue 404 is associated with a unique processing device 401, 403. The example scheduling queues 404 are arranged as priority queues. Each example scheduling queue 404 is static, organized with a predefined, specific read policy (e.g., FIFO, prioritized, etc), and orders computation according to priority.

Figure 7A:
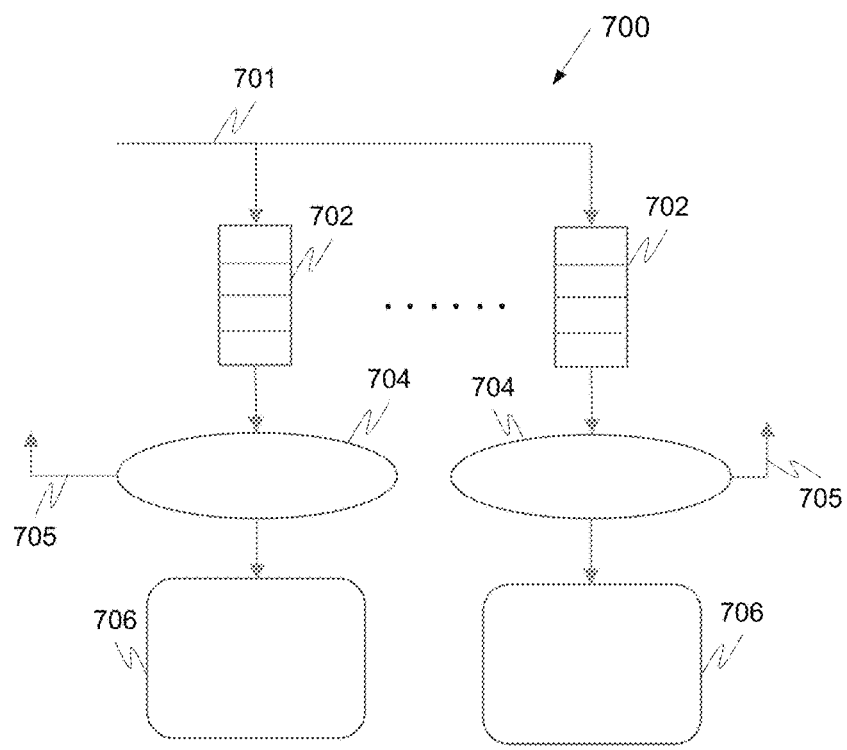
FIG. 7A is a block diagram depicting an example environment associated with an instruction stream manager, in accordance with various embodiments.

FIG. 7A is a block diagram depicting an example environment 700 associated with an instruction stream manager. The example environment 700 includes a plurality of CPU queues 702, a plurality of CPU schedulers 704, and a plurality of CPUs 706, that have received tasks (e.g., Task1, Task2, Task3) from the CPU schedulers 704. Each of the example CPU schedulers 704 is assigned to a specific CPU 706 and a specific scheduling queue 702. A set of predefined tasks is assigned to each CPU 706, and a task may require the execution of computations from one or more streams. For each stream, CPU computations 701 are always assigned to a specific CPU 706 and the tasks of the specific CPU 706. Each example CPU scheduler 704 is configured to schedule tasks to its associated CPU 706 based on task priority, release time, and deadline. Each example CPU scheduler 704 is configured to monitor usage of its associated CPU 706 and report the usage 705 to the dispatcher module (e.g., example dispatcher 402).

Figure 7B:
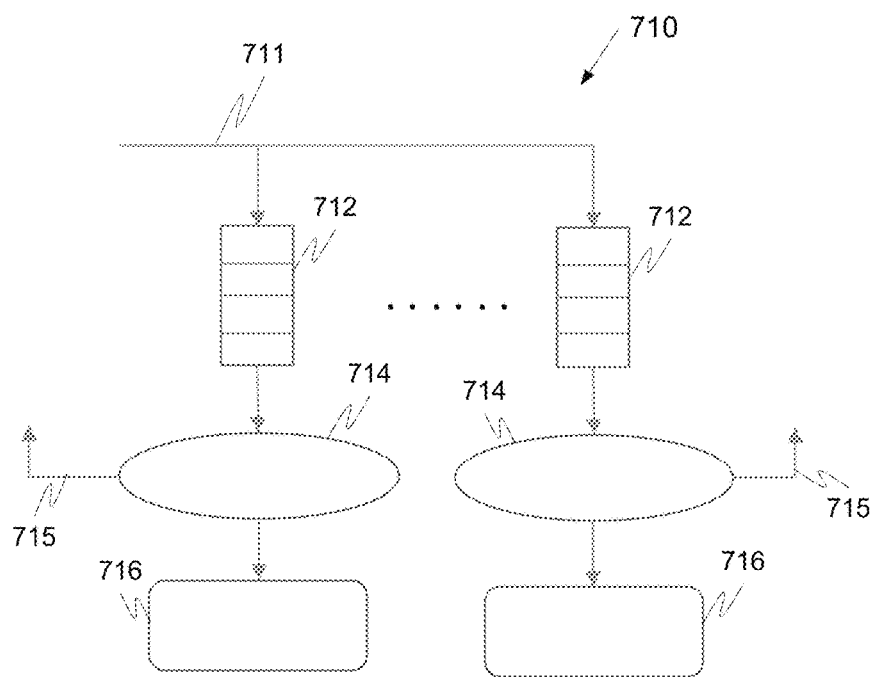
FIG. 7B is a block diagram depicting an example environment associated with an instruction stream manager, in accordance with various embodiments.

FIG. 7B is a block diagram depicting another example environment 710 associated with an instruction stream manager. The example environment 710 includes a plurality of accelerator queues 712, a plurality of accelerator schedulers 714, and a plurality of accelerators 716. Each of the example accelerator schedulers 704 is assigned to a specific scheduling queue 712 and a specific accelerator 716 or type of accelerator that shares the same scheduling policy. Each example accelerator scheduler 714 is configured to schedule accelerator computations 711 to its associated accelerator 716 based on priority, release time, and deadline. Each example accelerator scheduler 714 is configured to schedule accelerator computations 711 from different streams to its associated accelerator 716 for execution in ascending order of their dispatch when the start of execution is not dependent on the completion of a precedent CPU task. Each example accelerator scheduler 714 is configured to communicate with a CPU scheduler 704 that is assigned tasks with computations from a stream serviced by the accelerator scheduler 714, but is not configured to communicate with other accelerator schedulers 714. Each example accelerator scheduler 714 can communicate with a CPU scheduler 704 that is assigned tasks with computations from a stream serviced by the accelerator scheduler 714 to determine when computations dependent on completion of tasks by a CPU 706 can be scheduled. Each example accelerator scheduler 714 is configured to monitor usage of its associated accelerator 716, use a bandwidth server (not shown) to regulate requests from different streams, and report the usage 715 to the dispatcher module (e.g., example dispatcher 402).

Figure 8:
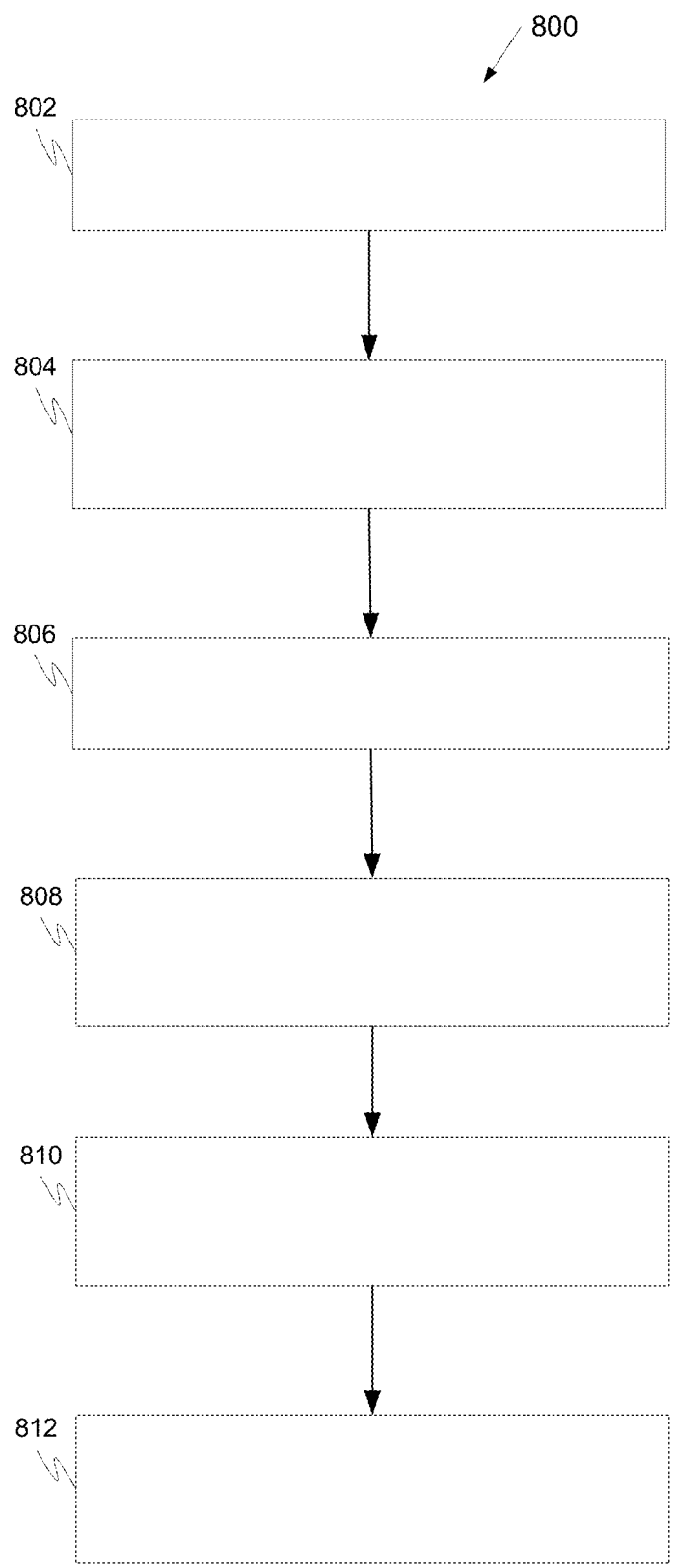
FIG. 8 is a process flow chart depicting an example process in an example instruction stream manager for managing the distribution of instructions to a plurality of processing devices, in accordance with various embodiments.

FIG. 8 is a process flow chart depicting an example process 800 in an example instruction stream manager 400 (e.g., in a vision processing controller (VPC)) for managing the distribution of instructions (e.g., for processing perception data from multiple perception data sources using) to a plurality of processing devices. The order of operation within process 800 is not limited to the sequential execution as illustrated in the figure, but may be performed in one or more varying orders as applicable and in accordance with the present disclosure.

The example process 800 includes receiving the plurality of instruction streams, wherein each instruction stream including a plurality of requested computations (operation 802).

The example process 800 includes partitioning each instruction stream into a plurality of partitions based on a device or type of device to perform a requested computation from the instruction stream (operation 804).

The example process 800 includes assigning a release time and deadline to each partition (operation 806), wherein the release time is the earliest point in time at which the partition can start to execute and the deadline is the latest point in time at which the partition must be completed to ensure performance. The partitions of the same stream are to be scheduled for computation on different devices assigned a partition from the same stream, based on release time and deadline, to reduce synchronization overhead for synchronizing computation performance by the different devices.

The example process 800 includes dispatching partition computations to a plurality of scheduling queues to distribute processing of the partition computations amongst the plurality of processing devices (operation 808), wherein a partition computation includes a partition with its assigned release time and deadline. The plurality of scheduling queues include a plurality of CPU scheduling queues and a plurality of accelerator scheduling queues.

The example process 800 further includes scheduling tasks by a CPU scheduler to its associated CPU based on task priority, release time, and deadline (operation 810) and scheduling computations by an accelerator scheduler from its associated queue to its associated accelerator (operation 812).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An instruction stream manager for managing the distribution of instructions to a plurality of processing devices, the plurality of processing devices including a plurality of central processing units (CPUs) and a plurality of accelerator devices, the instruction stream manager comprising:
a dispatcher module configured to:
receive multiple instruction streams, each instruction stream including a plurality of requested computations for processing perception data from a perception data source;
partition each instruction stream into a plurality of partitions based on a device or type of device to perform a requested computation from the instruction stream;
assign a release time and deadline to each partition, the release time being the earliest point in time at which the partition can start to execute, the deadline being the latest point in time at which the partition must be completed to ensure performance, wherein the partitions of the same stream are to be scheduled for computation on different devices assigned a partition from the same stream, based on time, to reduce synchronization overhead for synchronizing computation performance by the different devices; and
dispatch partition computations to a plurality of scheduling queues to distribute processing of the partition computations amongst the plurality of processing devices, a partition computation comprising a partition with its assigned release time and deadline;
the plurality of scheduling queues arranged in memory, wherein each scheduling queue is associated with a unique processing device, the plurality of scheduling queues including:
a plurality of CPU schedulers, wherein each CPU scheduler is assigned to a specific CPU and a specific scheduling queue; and
a plurality of accelerator schedulers, wherein each accelerator scheduler is assigned to a specific scheduling queue and a specific accelerator or type of accelerator that shares the same scheduling policy.

2. The stream manager of claim 1, wherein to assign a release time and deadline, the dispatcher module is configured to compute the release time and deadline.

3. The stream manager of claim 2, wherein to compute the release time and deadline, the dispatcher module is configured to determine the release time and deadline for processing a frame of perception data using proportional time slicing.

4. The stream manager of claim 2, wherein to compute the release time and deadline, the dispatcher module is configured to determine the release time and deadline for processing a frame of perception data by setting the release time of the first partition as the start time of a frame, setting the release time of a subsequent partition as the deadline of the immediately prior partition, and setting the deadline of a partition equal to the release time of the partition plus a proportional time slice of the frame.

5. The stream manager of claim 2, wherein to compute the release time and deadline, the dispatcher module is configured to determine the release time and deadline for processing a frame of perception data by $r_1 = t_0$, $r_i = d_{i-1}$, and $$d_i = r_i + \frac{D - \sum e_i}{\sum e_i} * e_i,$$

wherein $r_1$ is the initial release time, $t_0$ is start time of a frame in the stream, $r_i$ is the release time of partition i on its device, partition i on its device, $d_i$ is the deadline of partition i on its device, D is maximum allowed time to finish processing of a frame, and $e_i$ is processing time of partition i on its device.

6. The stream manager of claim 1, wherein to dispatch partition computations, the dispatcher module is configured to assign computations for streams to processing devices according to predefined strategies and regulate the processing of each stream when one stream overuses its assigned processing unit.

7. The stream manager of claim 1, wherein to dispatch partition computations, the dispatcher module is configured to scan the streams according to their rates, provide a static assignment of CPUs for streams, and provide a static assignment of accelerators for streams.

8. The stream manager of claim 1, wherein the dispatcher module is further configured to notify a higher level entity that incorporates the dispatcher module for action, and/or execute a predefined admission control policy when a stream exceeds its resource budget.

9. The stream manager of claim 1, wherein to dispatch partition computations, the dispatcher module is configured to:
   read input from a stream identifier;
   process a current code segment of the stream identifier;
   select a device identifier with minimum usage to run the code segment of the stream identifier;
   determine if the code segment of the stream identifier can be completed on the device identifier selected to run the code segment of the stream identifier based on release time, deadline, and device usage;
   send the code segment of the stream identifier to the device identifier selected to run the code segment of the stream identifier when it is determined that the code segment of the stream identifier can be completed on the device identifier selected to run the code segment of the stream identifier;
   exclude the device identifier selected to run the code segment of the stream identifier and select a different device identifier with minimum usage to run the code segment of the stream identifier, when it is determined that the code segment of the stream identifier cannot be completed on the device identifier selected to run the code segment of the stream identifier and another device identifier selected to run the code segment of the stream identifier exists that can be considered for use;
   send a notification to a higher level entity and/or execute a strategy and move to next stream identifier when it is determined that the code segment of the stream identifier cannot be completed on the device identifier selected to run the code segment of the stream identifier and another device identifier cannot be selected to run the code segment of the stream identifier;
   after sending the code segment of the stream identifier to the device identifier to run the code segment of the stream identifier, move to the next code segment of the stream identifier when another code segment of the stream identifier exists; and
   after sending the code segment of the stream identifier to the device identifier to run the code segment of the stream identifier, move to the next stream identifier when another code segment of the stream identifier does not exist.

10. The stream manager of claim 1, wherein each scheduling queue is static, organized with a predefined, specific read policy, and orders computation according to priority.

11. The stream manager of claim 1, wherein:
   a set of predefined tasks is assigned to each CPU;
   a task may execute computations from one or more streams;
   for each stream, CPU computations are always assigned to a specific CPU and the tasks of the specific CPU;
   each CPU scheduler is configured to schedule tasks to its associated CPU based on task priority, release time, and deadline; and
   each CPU scheduler is configured to monitor usage of its associated CPU and report the usage to the dispatcher module.

12. The stream manager of claim 1, wherein:
   each accelerator scheduler is configured to schedule accelerator computations to its associated accelerator based on priority, release time, and deadline;
   each accelerator scheduler is configured to schedule accelerator computations from different streams to its associated accelerator for execution in ascending order of their dispatch when start of execution is not dependent on completion of precedent CPU task;
   each accelerator scheduler is configured to communicate with a CPU scheduler that is assigned tasks with computations from a stream serviced by the accelerator scheduler, but is not configured to communicate with other accelerator schedulers; and
   each accelerator scheduler is configured to monitor usage of its associated accelerator, use bandwidth server to regulate requests from different streams, and report the usage to the dispatcher module.

13. A method in a multiprocessor system for managing the distribution of instructions from a plurality of instruction streams to a plurality of processing devices, the plurality of processing devices including a plurality of central processing units (CPUs) and a plurality of accelerator devices, the method comprising:
   receiving the plurality of instruction streams, each instruction stream including a plurality of requested computations;
   partitioning each instruction stream into a plurality of partitions based on a device or type of device to perform a requested computation from the instruction stream;
   assigning a release time and deadline to each partition, the release time being the earliest point in time at which the partition can start to execute, the deadline being the latest point in time at which the partition must be completed to ensure performance, wherein the partitions of the same stream are to be scheduled for computation on different devices assigned a partition from the same stream, based on release time and deadline, to reduce synchronization overhead for synchronizing computation performance by the different devices; and
   dispatching partition computations to a plurality of scheduling queues to distribute processing of the partition computations amongst the plurality of processing devices, a partition computation comprising a partition with its assigned release time and deadline, the plurality of scheduling queues arranged in memory, wherein each scheduling queue is associated with a unique processing device.

14. The method of claim 13, wherein assigning a release time and deadline comprises computing the release time and deadline.

15. The method of claim 14, wherein computing the release time and deadline comprises determining the release time and deadline for processing a frame of perception data using proportional time slicing.

16. The method of claim 14, wherein computing the release time and deadline comprises determining the release time and deadline for processing a frame of perception data by setting the release time of the first partition as the start time of a frame, setting the release time of a subsequent partition as the deadline of the immediately prior partition, and setting the deadline of a partition equal to the release time of the partition plus a proportional time slice of the frame.

17. The method of claim 14, wherein computing the release time and deadline comprises determining the release time and deadline for processing a frame of perception data by $r_1 = t_0$, $r_i = d_{i-1}$, and $$d_i = r_i + \frac{D - \sum e_i}{\sum e_i} * e_i,$$

wherein $r_1$ is the initial release time, $t_0$ is start time of a frame in the stream, $r_i$ is the release time of partition i on its device, partition i on its device, $d_i$ is the deadline of partition i on its device, D is maximum allowed time to finish processing of a frame, and $e_i$ is processing time of partition i on its device.

18. The method of claim 13, wherein dispatching partition computations comprises assigning computations for streams to processing devices according to predefined strategies and regulating the processing of each stream when one stream overuses its assigned processing unit.

19. The method of claim 13, wherein dispatching partition computations comprises scanning the streams according to their rates, providing a static assignment of CPUs for streams, and providing a static assignment of accelerators for streams.

20. A perception processing system configured for processing perception data from multiple perception data sources, the system comprising:
- a plurality of processing units comprising a plurality of central processing units (CPUs) and a plurality of accelerator modules;
- a vision processing controller (VPC) configured to perform computations from multiple instruction streams using the plurality of processing units; and
- a dispatcher module configured to:
  - receive the multiple instruction streams, each instruction stream including a plurality of requested computations for processing perception data from a perception data source;
  - partition each instruction stream into a plurality of partitions based on a device or type of device to perform a requested computation from the instruction stream;
  - assign a release time and deadline to each partition, the release time being the earliest point in time at which the partition can start to execute, the deadline being the latest point in time at which the partition must be completed to ensure performance, wherein the partitions of the same stream are to be scheduled for computation on different devices assigned a partition from the same stream, based on time, to reduce synchronization overhead for synchronizing computation performance by the different devices; and
  - dispatch partition computations to a plurality of scheduling queues to distribute processing of the partition computations amongst the plurality of processing devices, a partition computation comprising a partition with its assigned release time and deadline, the plurality of scheduling queues arranged in memory, wherein each scheduling queue is associated with a unique processing device.

* * * * *